June 1, 1965 W. C. MILLER ETAL Re. 25,790
CAMERA COVER LOCK AND FOOTAGE INDICATOR MECHANISM
Original Filed July 11, 1960
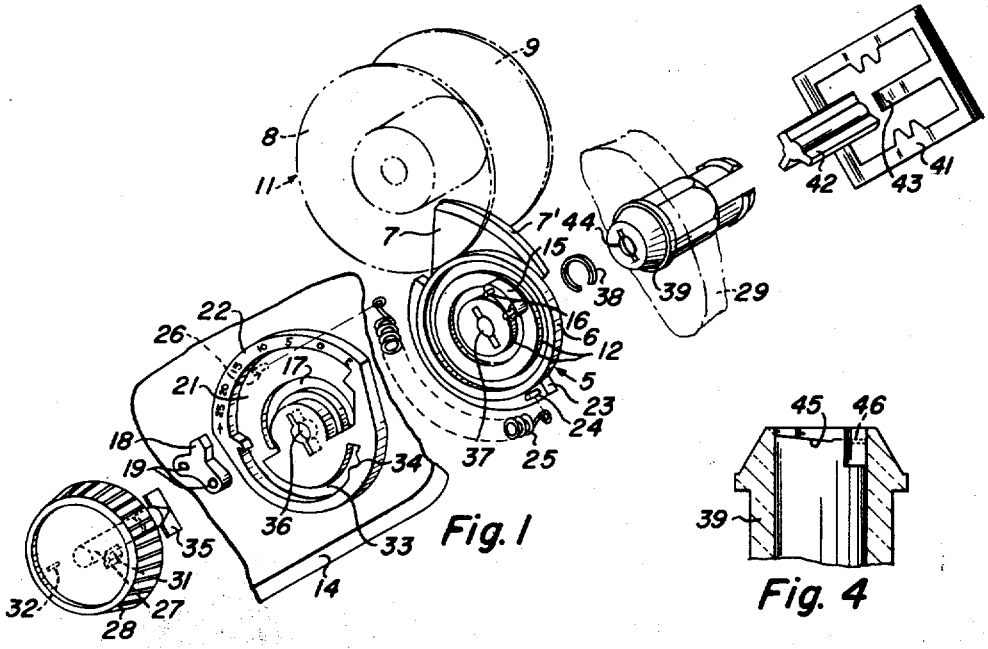
Fig. 1
Fig. 4
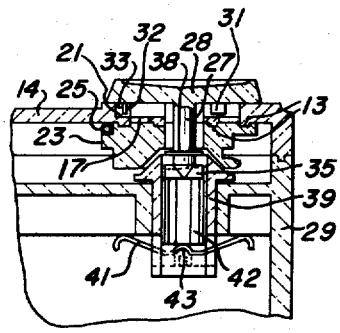
Fig. 3
Fig. 2
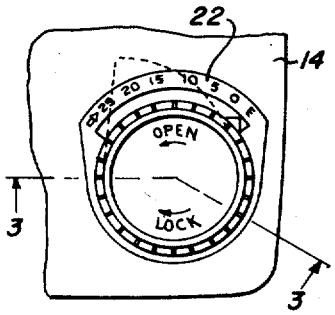
WALTER C. MILLER
HENRY O. SCHMITT JR.
INVENTORS
BY R. Frank Smith
Steve W. Gremlow
ATTORNEYS United States Patent Office Re. 25,790
Reissued June 1, 1965

25,790
CAMERA COVER LOCK AND FOOTAGE INDICATOR MECHANISM

Walter C. Miller and Henry O. Schmitt, Jr., Rochester, N.Y., assignors to Eastman Kodak Company, Rochester, N.Y., a corporation of New Jersey Original No. 3,062,117, dated Nov. 6, 1962, Ser. No. 41,939, July 11, 1960. Application for reissue Feb. 20, 1963, Ser. No. 260,354
10 Claims. (Cl. 95—31)

Matter enclosed in heavy brackets [ ] appears in the original patent but forms no part of this reissue specification; matter printed in italics indicates the additions made by reissue.

This invention relates generally to cameras, and more specifically to a cover lock and footage indicator mechanism for a camera.

It is well known in the art to provide a camera with a footage indicator mechanism comprising a pivotal footage indicator [cam] *arm* biased into engagement with the periphery of a roll of film. The [cam] *arm* is connected to an indicator needle which cooperates with a footage scale to indicate the footage of film that remains unexposed. It is also well known in the art to provide a camera with a cover plate which is releasably secured to the camera case by means of some suitable locking means. [In this] *This* invention *provides* an improved combined lover lock and footage indicator mechanism [is disclosed] for a camera [in which], *the moveable parts of the mechanism being carried by the cover. In this construction,* movement of the cover locking means to an "open" position simultaneously releases the locking means so that the cover may be [removed from the camera] *opened* and retracts [the footage indicator cam] *a film sensing arm* from [the] *a* film spool *in the camera* so that [it] *the sensing arm* is clear of the spool flanges [, and further]. *Means may be provided for* releasably [holds] *holding* the [cam] *sensing element* in this retracted position. The cover may then readily be [removed from the camera] *opened* without any interference between the [cam] *sensing arm* and the spool flanges. When the locking means is moved into a "latched" position for releasably locking the cover to the camera case, the [footage indicator cam] *film sensing arm* is [free from the locking means for independent operation for continuously indicating the unexposed footage of film on the film spool.] *released from such retracted position for movement to a film sensing position.*

One of the primary objects of the present invention is to provide [a camera having] an improved cover lock and *film* footage indicator mechanism *for cameras, wherein the moveable parts of the mechanism are carried by the cover.*

[Another object of this invention is to provide an improved camera in which movement of the cover lock means into a position releasing the cover from the camera case automatically retracts the footage indicator mechanism so that it will not interfere with the film spool flanges, and further releasably holds the footage indicator mechanism in the retracted position.]

A further object of the invention is to provide an improved camera having a cover lock and footage indicator mechanism of simple design and construction, thoroughly reliable and efficient in operation, and economical to manufacture, the moving parts being carried by the cover.

[A more specific object of the invention is the provision of an improved camera having a cover lock and footage indicator mechanism in which movement of the cover lock means into an "open" position releases the cover from the camera case, withdraws the footage indicator mechanism from an operative to an inoperative position, and releasably holds the indicator mechanism in its inoperative position, and movement of the cover lock means into a "latched" position releasably secures the cover to the camera case and releases the footage indicator mechanism which is moved by a spring to its operative position for operation independent of the cover lock means.]

Objects and advantages other than those set forth above will be apparent from the following description when read in connection with the acompanying drawing, in which:

FIG. 1 is an exploded view in perspective showing a preferred embodiment of this invention;

FIG. 2 is a segmental front elevation view of the camera cover;

FIG. 3 is a section view taken along line 3—3 of FIG. 2; and

FIG. 4 is an enlarged segmental view of a portion of the latching receptacle.

As shown in the drawings, a footage indicator cam 5 is disclosed as a unitary plastic member having a circular portion 6 and a film-engaging arm 7 interposed between flanges 8, 9 of a spool 11 for engaging the periphery of a roll of film, not shown, wound on spool 11. The circular body portion 6 has a pair of radially spaced annular grooves 12 for receiving complementary annular rings 13 extending from one side of camera cover 14 as best seen in FIG. 3 to form a light lock. The body portion 6 further has an arcuate projection 15, seen best in FIG. 1, formed between annular grooves 12 and having a pair of pins 16 extending therefrom. In the assembled position, projection 15 extends through an arcuate slot 17 in camera cover 14. A footage indicator needle 18 formed of a colored plastic material so that it stands out from cover 14 has two openings 19 complementary to pins 16 for mounting needle 18 onto projection 15. Upon movement of cam 5, indicator needle 18 is carried therealong in an arcuate depression or groove 21 formed by cover 14, and its end cooperates with a footage scale 22 imprinted on cover 14. The footage indicator cam 5 further has an arcuate rib 23 having a pin 24 to which one end of a spring 25 is secured. The opposite end of spring 25 is secured to a pin 26, shown dotted in FIG. 1, formed by cover 14, and rib 23 cooperates with cover 14 to form a retaining groove for spring 25 as seen in FIG. 3. The spring 25 is under tension and urges footage indicator cam 5 in a clockwise direction as seen in FIG. 1 to an operative position in which arm 7 engages the periphery of the roll of film.

A spindle 27 is shown having a control knob 28 at one end provided with a ribbed periphery to facilitate turning knob 28 in one direction or the other. As seen in FIG. 2, knob 28 has the words "open" and "lock" imprinted therein and arrows associated therewith to indicate to the operator the direction knob 28 must be turned to lock cover 14 to camera body 29 or to unlatch cover 14 therefrom. It is clear that clockwise turning of knob 28 will move the knob into the "lock" position, and turning knob 28 in the opposite direction moves the knob into the "open" position. The control knob 28 has a lug 31 integrally formed therewith laterally extending from its inner surface into cover slot 17 adjacent projection 15, and adapted to engage projection 15 upon turning of knob 28 to its "open" position. The knob 28 further has a resilient pin 32 integrally formed therewith and laterally extending from its inner surface into an arcuate slot 33 formed by cover 14, as seen in FIGS. 1 and 3, and having one end connected to groove 21. The other end of slot 33 terminates in a recess 34 for receiving pin 32 to form a stop for knob 28 and a detent for releasably holding pin 32 and knob 28 in the "open" position when it is moved therein. When knob 28 is rotated in the opposite direction, lug 31 engages the end of slot 17 to stop knob 28 in its "lock" position. The opposite end of spindle 27 has a pair of integrally formed, radially extending ribs 35 which are insertable through complementary shaped openings 36, 37 respectively formed in ocver 14 and cam 5. The portion of cover 14 forming opening 36 functions as a bearing for spindle 27, and cam 5 is loosely mounted on spindle 27 so that it may be independently rotated thereon. The cam 5 is retained on spindle 27 by a retaining ring 38 cooperating with a complementary groove formed by spindle 27.

A locking receptacle 39 is slidably carried by camera body 29, and is retained thereto by a retaining spring 41 which permits slight axial movement of receptacle 39. The receptacle 39 is hollow and receives a spacer element 42 interposed between one end of receptacle 39 and a spring finger 43 formed by retaining spring 41. The end of receptacle 39 further has an opening 44 complementary to ribs 35. When cover 14 is properly positioned on camera body 29, ribs 35 extend into receptacle 39 and urges spacer element 42 against the bias spring finger 43 as best seen in FIG. 3. Turning knob 28 into the "lock" position causes ribs 35 to ride along complementary ramps 45 formed by receptacle 39 tending to pull receptacle 39 toward cover 14 against the bias of retaining spring 41 until ribs 35 drop into recesses 46 at the end of ramps 45 for releasably holding cover 14 to camera body 29 as seen in FIG. 3. In the "lock" position, it is the force of retaining spring 41 that urges cover 14 into engagement with camera body 29. When control knob 28 is moved to the "open" position, spring finger 43 urges ribs 35, spindle 27 and cover 14 a short distance away from camera body 29 to facilitate its removal.

In the operation of this invention, let us assume initially that control knob 28 is in a "lock" position releasably securing cover 14 to camera body 29 as seen in FIG. 3. Let us further assume that we have a fresh spool of film in the camera. The footage indicator cam 5 which is free to turn about spindle 27 is urged by its spring 25 in a clockwise direction causing its arm 7 to engage the periphery of the film interposed between spool flanges 8, 9. The indicator needle 18 would, in this position, align itself with the numeral 25 on footage scale 22 to indicate that there is 25 feet of unexposed film in the camera. As the operator takes pictures, the spool of film decreases in diameter and indicator cam 5 and needle 18 follows the periphery of film by virtue of spring 25 causing needle 18 to move relative to scale 22 to continuously indicate the number of feet of unexposed film remaining in the camera. After all the film has been exposed, the operator turns control knob 28 from the "lock" position to the "open" position. As knob 28 is turned, lug 31 engages projection 15 and moves projection 15 and cam 5 against the bias of its spring 25 withdrawing arm 7 so that it is a further radial distance from the center of spool 11 than the periphery of flanges, 8, 9 and hence free of interference with them. In the "open" position, pin 32 bottoms in recess 34 to releasably hold control knob 28 and cam 5 in the "open" position. In this position, spring finger 43 urges spacer element 42, spindle 27 and cover 14 a short distance away from camera body 29. The operator may then remove cover 14 in a simple manner, and not have to concern himself with any interference between arm 7 and the outer flange 8 of spool 11. After a new spool of film has been placed in the camera, the operator may then replace cover 14 on camera body 29 and turn knob 28 to the "lock" position for releasably locking cover 14 thereto. As knob 28 is turned to the "lock" position, lug 31 is moved therealong away from projection 15 permitting spring 25 to move cam 5 in a clockwise direction until arm 7 engages the periphery of the new spool of film.

The invention has been described in detail with particular reference to a preferred embodiment thereof, but it will be understood that variations and modifications can be effected within the spirit and scope of the invention as described hereinabove and as defined in the appended claims.

We claim:

1. In a combined cover lock and footage indicator mechanism for a roll film camera, the combination comprising: a camera body supporting a latching receptacle and adapted to receive such roll of film to be exposed; a cover for said body having an arcuate slot therethrough, a first arcuate groove adjacent said slot, and a footage scale adjacent said first groove; a spindle rotatably supported by said cover and having a control knob at one end and a latching element at the opposite end adapted to cooperate with said latching receptacle for releasably locking said cover to said camera body upon moving said knob from an open position in which said cover is unlatched from said body to a latched position; a unitary indicator member rotatably mounted on said spindle and having an arm, said indicator member being movable by a spring from an inoperative position in which said arm is disengaged from the periphery of said roll of film to an operative position in which said arm is responsive to the change in diameter of said roll of film as it is being exposed, said indicator member further having a projection extending through said slot; an indicator needle mounted on said projection for movement in said first groove and cooperating with said footage scale to indicate the footage of unexposed film in said camera; and a lug formed by said control knob extending into said slot and adapted to engage said projection and urge said indicator member into its inoperative position against the bias of said spring upon movement of said knob into its open position unlatching said cover from said body, said knob when moved into its latched position to lock said cover to said body, withdrawing said lug from said projection whereby said spring urges said arm into engagement with the periphery of said roll of film.

2. The invention according to claim 1 wherein a detent is provided for releasably holding said knob in said open position.

3. The invention according to claim 2 wherein said detent comprises a flexible pin formed by said knob and movable in a second arcuate groove formed by said cover and engageable with a recess adjacent one end of said second groove.

4. In a combined cover lock and footage indicator mechanism for a roll-film camera [,the combination comprising:] *having* a camera body adapted to support film supply and take-up rolls arranged for movement of film from the first to the second for exposure [;] *and* a cover for said body [;] , *the combination comprising*: control means movable between an open position in which said cover is unlatched from said body, and a latched position in which said cover is releasably secured to said body; a film-contacting element rotatably mounted about a portion of said control means and movable from an inoperative position in which said film-contacting element in disengaged from one of said rolls of film to an operative position in which said film-contacting element is in engagement with the periphery of said one of said rolls of film and is responsive to the change in diameter of said one of said rolls of film as said film is moved from said supply roll to said take-up roll; biasing means normally urging said film-contacting element into its operative position; indicating means including a part on said film-contacting element and a part on said cover, said parts adapted to cooperate together for continually indicating the footage of unexposed film in the camera when said film-contacting element is in its operative position; and means for interconnecting said control means and said film-contacting element whereby said film-contacting element is moved to its inoperative position by said control means upon movement of said control means to its open position, and is moved to its operative position by said biasing means upon movement of said control means from its open position to its latched position.

5. The invention according to claim 4 wherein said cover has a slot, said part on said cover comprises a footage scale, and said part on said film-contacting element comprises an indicator needle extending into said slot and co-operating with said footage scale.

6. The invention according to claim 4 wherein a detent releasably holds said control means in its open position.

7. The invention according to claim 6 wherein said control means comprises a spindle having a manually actuatable knob at one end, and said detent comprises a flexible pin carried by said knob engageable with a recess formed by said cover.

8. A combined cover lock and film footage indicator mechanism for a camera having a camera body provided with mounting means for a roll of film carried on a flanged spool and having a cover located in closed position on the camera body during normal operation of the camera and movable to an open position for [loading film into the unloading film] *placing a spool on and removing a spool* from said mounting means, said mechanism comprising: a latching element carried by said cover on the inner side thereof, a control knob carried by said cover on the outer side thereof for rotating said latching element between latched and unlatched positions, means mounted on said camera body for receiving said latching element when the cover is closed and for holding said cover in said closed position when the latching element is in latched position, a rotatable film sensing element carried by said cover on the inner side thereof in a position to engage film between the flanges of a spool located on said mounting means when said cover is in closed position, means carried by the cover and biasing said sensing element in a film-engaging direction, means carried by the cover and interconnecting said film sensing element and said knob for movement of the sensing element to a retracted position clear of said flanged spool when the knob moves said latching element to unlatched position, and means carried by the cover and visible from outside said cover for indicating the position of said film sensing element.

9. A mechanism according to claim 8 and detent means for retaining said film sensing element in its retracted position and said latching element in its unlatched position.

10. Mechanism according to claim 8 wherein said knob, latching element and sensing element are coaxially positioned.

References Cited by the Examiner

The following references, cited by the Examiner, are of record in the patented file of this patent or the original patent.

UNITED STATES PATENTS

| | | | |
|---|---|---|---|
| 1,583,656 | 5/26 | Chapman et al. | 33—172 |
| 1,583,707 | 5/26 | Tessier | 352—242 |
| 2,029,736 | 2/36 | Morsbach | 352—176 |
| 2,819,647 | 12/49 | Golick et al. | 352—172 |

JOHN M. HORAN, *Primary Examiner.*